United States Patent [19]
Scheibel

[11] Patent Number: 5,890,866
[45] Date of Patent: Apr. 6, 1999

[54] SELF-LOADING MATERIAL OR EQUIPMENT TRANSPORTER

[75] Inventor: Craig C. Scheibel, Mequon, Wis.

[73] Assignee: Gear-Rig, LLC, Mequon, Wis.

[21] Appl. No.: 591,603

[22] PCT Filed: Jun. 9, 1995

[86] PCT No.: PCT/US95/07359

§ 371 Date: Feb. 9, 1996

§ 102(e) Date: Feb. 9, 1996

[87] PCT Pub. No.: WO95/34499

PCT Pub. Date: Dec. 21, 1995

Related U.S. Application Data

[63] Continuation-in-part of Ser. No. 257,798, Jun. 10, 1994, Pat. No. 5,538,386.

[51] Int. Cl.⁶ .......................................... B66F 9/06
[52] U.S. Cl. .......................... 414/467; 414/346; 414/347
[58] Field of Search ..................................... 414/340, 343, 414/345–347, 391, 392, 399, 458, 467, 498, 639, 672; 296/20

[56] References Cited

U.S. PATENT DOCUMENTS

| | | | |
|---|---|---|---|
| 3,082,016 | 3/1963 | Pratt | 296/20 X |
| 3,088,770 | 5/1963 | Weil et al. | 296/20 |
| 3,865,262 | 2/1975 | Smith, Jr. | |
| 3,885,685 | 5/1975 | Montgomery et al. | |
| 3,972,427 | 8/1976 | Stanley et al. | |
| 4,015,736 | 4/1977 | Erickson | |
| 4,050,672 | 9/1977 | Lane | 254/10 |
| 4,103,795 | 8/1978 | Miller | |
| 4,316,687 | 2/1982 | Lindskog | 410/92 |
| 4,369,985 | 1/1983 | Bourgraf et al. | 296/20 X |
| 4,408,739 | 10/1983 | Buchsel | 244/137 |
| 4,460,064 | 7/1984 | Lutz et al. | 187/9 |
| 4,604,022 | 8/1986 | Bourgraf | 414/340 |
| 4,613,272 | 9/1986 | Vom Braucke et al. | 414/347 |
| 4,632,627 | 12/1986 | Swallows | 414/490 |
| 5,015,024 | 5/1991 | Bloemer | 296/20 |
| 5,018,931 | 5/1991 | Uttley | 414/495 |
| 5,084,922 | 2/1992 | Louit | 296/20 X |
| 5,217,342 | 6/1993 | Grether | 414/635 |
| 5,320,475 | 6/1994 | Pinder | 414/467 X |
| 5,322,496 | 6/1994 | Ernst et al. | 493/410 |
| 5,503,424 | 4/1996 | Agopian | 414/498 X |
| 5,509,159 | 4/1996 | Du-Bois | 296/20 X |
| 5,593,272 | 1/1997 | Green | 414/498 |

FOREIGN PATENT DOCUMENTS

| | | |
|---|---|---|
| 762341 | 4/1934 | France . |
| 2317217 | 4/1977 | France . |
| WO 83/04226 | 12/1983 | WIPO . |

*Primary Examiner*—James W. Keenan
*Attorney, Agent, or Firm*—Andrus, Sceales, Starke & Sawall

[57] ABSTRACT

A transporter (10) for moving itself and a load (12) between storage and work positions at different levels. The transporter (10) includes a lift assembly (16) and a support assembly (14) pivotally or slidably mounted on the lift assembly (16). The lift assembly (16) is operatively connected to the support assembly (14) for movement between transporting and storage positions. The support assembly (14) includes wheels (26, 37) for providing movement for the entire unit in either the transport position or the storage position.

11 Claims, 16 Drawing Sheets

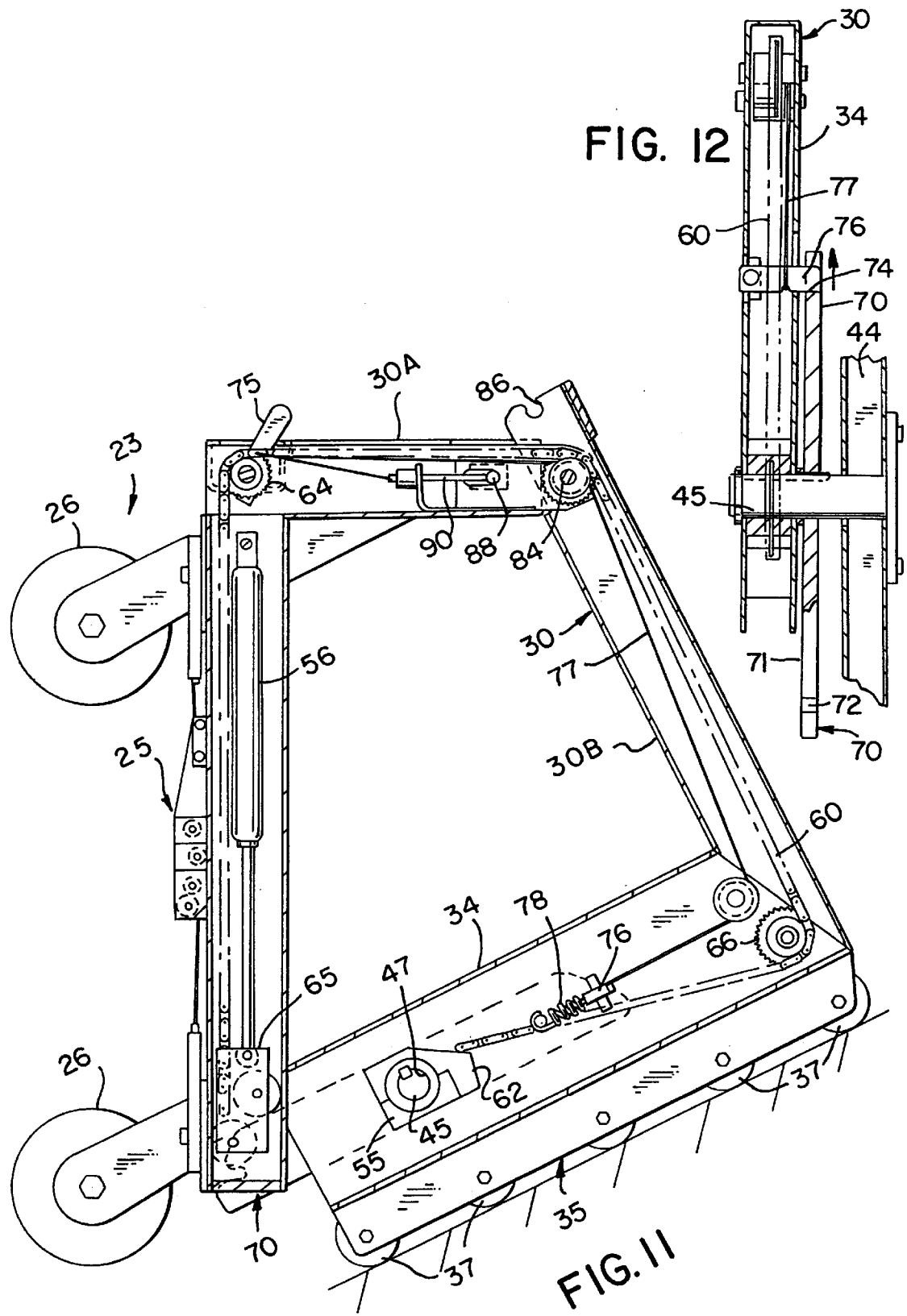

FIG. 23
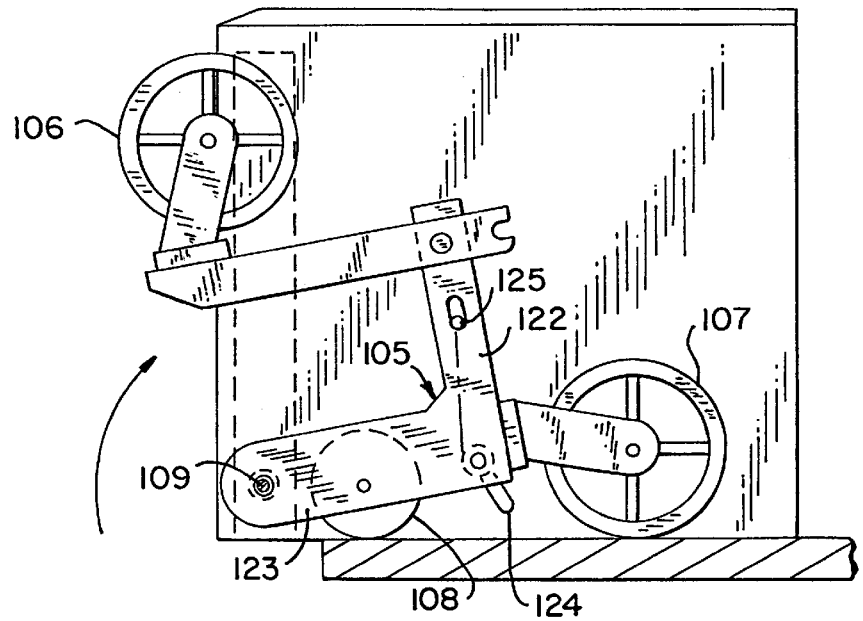
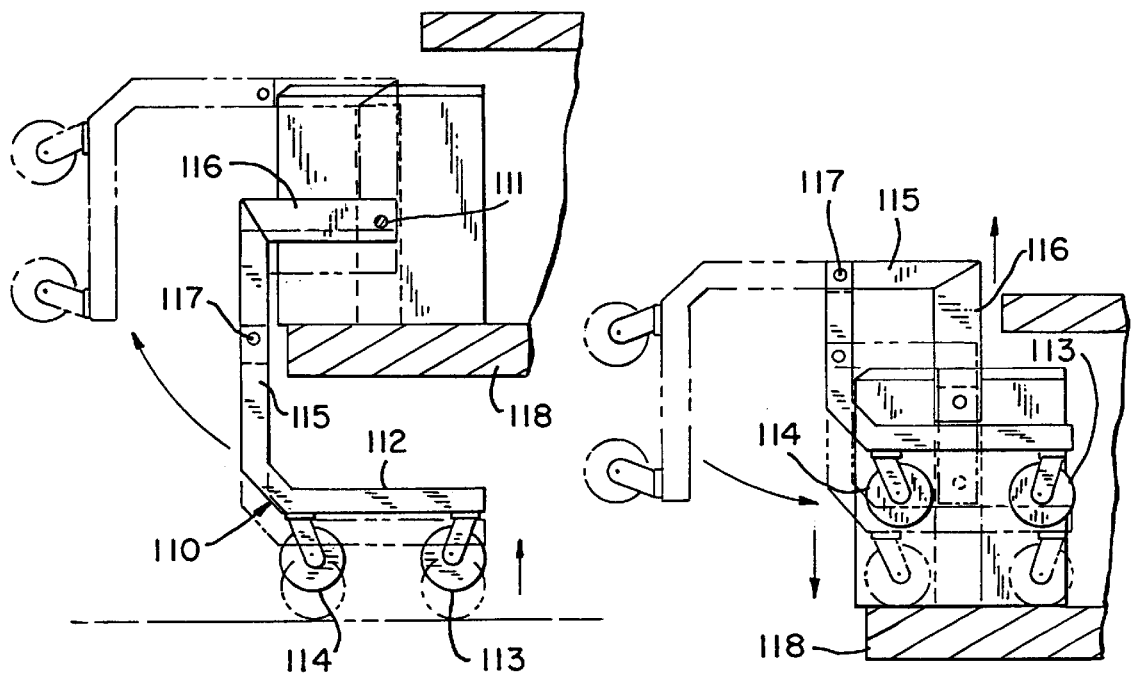
FIG. 24
FIG. 25

SELF-LOADING MATERIAL OR EQUIPMENT TRANSPORTER

This application is a §371 application based on PCT/US/95/07359, which is a continuation-in-part of U.S. Application No. 08/257,798 filed Jun. 10, 1994, now U.S. Pat. No. 5,538,386.

FIELD OF THE INVENTION

The present invention relates generally to a transporter for lifting equipment to an elevated surface and for lowering the equipment therefrom, and more particularly to a self-loading and unloading transporter which includes a support assembly and a lift assembly for raising or lowering both the transporter and the load from one level to another as a complete self-contained unit.

BACKGROUND OF THE INVENTION

Heavy and bulky material or equipment are difficult to handle both from different heights and different locations. The equipment used, however, must be readily transportable from one location to another. For instance, a tool box may be used at a variety of different job sites and will typically be hauled from one site to the next by a pickup truck or van.

One problem with loading such equipment as a conventional tool box is the loading and unloading of the box into and out of the vehicle. Often, the tool box is too heavy to manually load and unload without risk of injury or it takes numerous trips to move the equipment between the vehicle to a work location. Consequently, a hoist or forklift will be used to load and unload the equipment. This, of course, requires such additional machinery at the job site.

On the other hand, the tool box is left loaded on the vehicle. However, this presents additional problems since the vehicle and the tools are often required at separate locations.

There are many other situations where a relatively heavy load must be raised to an elevated surface or platform or lowered to a surface. This typically requires some type of separate equipment at the designated site for handling such heavy loads. It would be advantageous to have a self-contained assembly which included the equipment and a mechanism for independently loading and unloading the equipment.

SUMMARY OF THE PRESENT INVENTION

The present invention features a transporter having a support assembly for moving the transporter between different locations and a lift assembly to move a load such as a storage container or platform between a lower level and a higher level. The transporter is self-loading and unloading. In other words, both the transporter and the load move from one level to another level as a complete self-contained unit.

The storage container may be in the form of a tool box or a platform for supporting various types of loads or equipment. The transporter generally includes a support assembly for transporting the storage container and/or load to various job sites and a lift assembly for elevating the storage container and/or load as required at the work site. According to a particular preferred embodiment of the invention, the support assembly is generally C-shaped.

The lift assembly is mounted on the support assembly to transport the container or platform between work or storage positions. The lift assembly is configured to facilitate movement of the container or platform between a lower level and a surface disposed at a higher level. The lift assembly also is used to raise the support assembly to a storage position with respect to the lift assembly. In one embodiment, the support assembly is pivoted about the lift assembly and lowered onto the raised surface for transporting the container on the raised surface. In another embodiment the support assembly is slid or shifted laterally with respect to the lift assembly after the load is deposited on the higher surface. The support assembly is then raised to an elevated position, slid or shifted back to its original position, and lowered onto the higher surface for moving the load on that higher surface. The lift assembly raises the container to the higher level and preferably with the container supported over the raised surface. The lift assembly also allows these movements to be reversed so that the equipment may be moved from the higher level to the lower level.

One of the primary objects of the invention is to provide a transporter which has the capability to transport and elevate heavy equipment over surfaces at different elevations.

A further object is to provide a transporter wherein the support assembly can be quickly and easily stored with the storage container.

Another object of the invention is to provide the support assembly with two sets of roller assemblies for transporting the transporter at both transporting and storage positions.

One of the primary advantages of the transporter is to reduce the time required to set up the equipment for ready access to the user.

Another advantage of the transporter is the ability of the lift assembly to raise and lower the platform or container in relation to the support assembly or raise and lower the support assembly in relation to the container or platform.

A further advantage of the transporter is the ability of the support assembly to fully sustain the load without manual effort or reliance on other structure.

Another advantage of the transport is that the entire assembly is transportable at either level using the support assembly.

BRIEF DESCRIPTION OF THE DRAWINGS

The invention will hereafter be described with reference to the accompanying drawings, wherein like referenced numerals denote like elements, and;

FIG. 11 is a side view of the folding support assembly shown in the storage position;

FIG. 12 is a view taken on line 12—12 of FIG. 3;

FIG. 23 is a schematic side view of the transporter of FIG. 22 with its support assembly shown in its inverted position;

FIG. 24 is a schematic side view of a fourth embodiment of the transporter with its support assembly shown in its transport position, in its intermediate raised position, and again in its elevated position;

FIG. 25 is a schematic side view of the transporter of FIG. 24 with its support assembly shown pivoted to its storage position;

Figure 1:
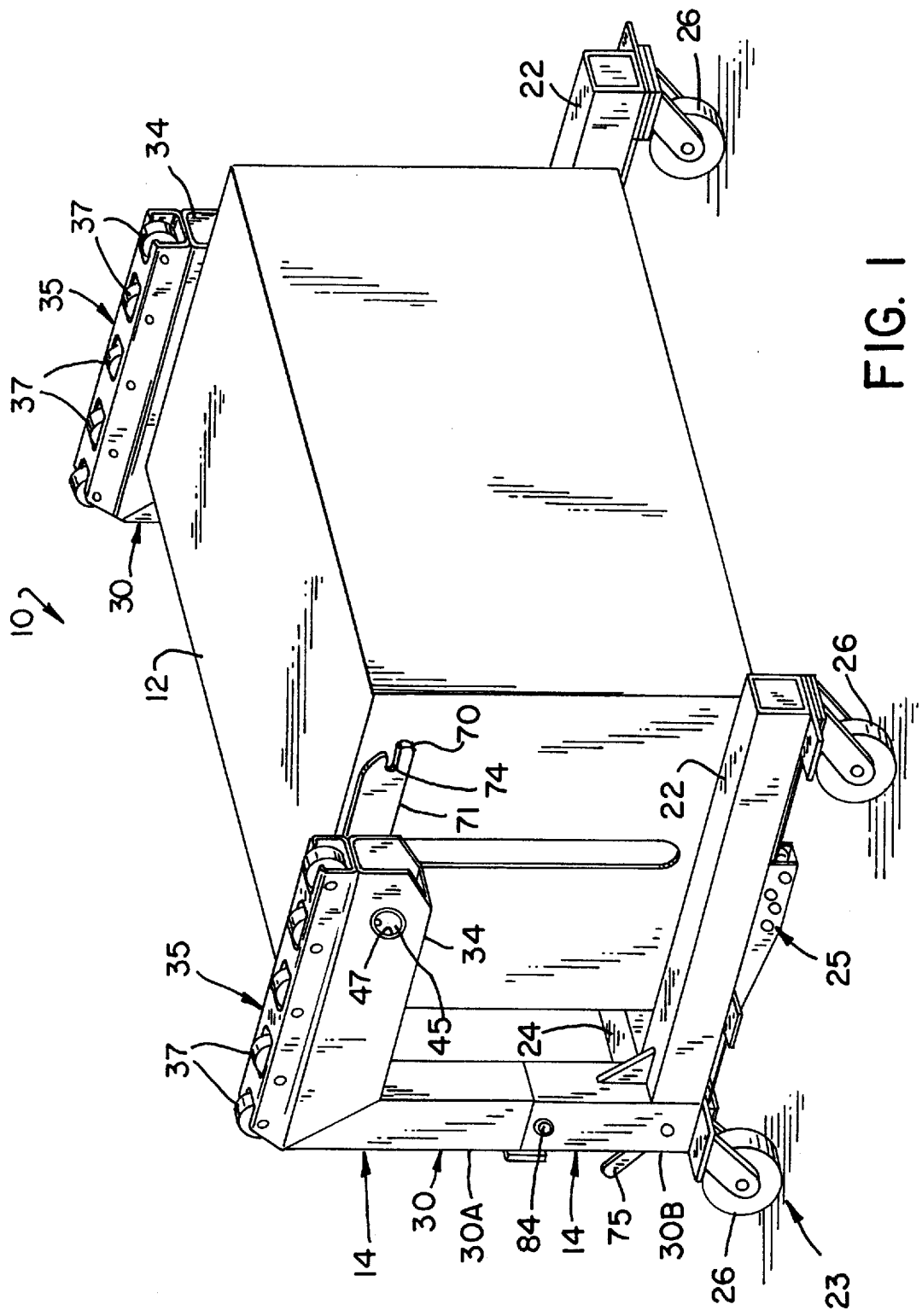
FIG. 1 is a perspective view of the transporter according to the invention.

Before explaining at least one embodiment of the invention in detail it is to be understood that the invention is not limited to its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 5:
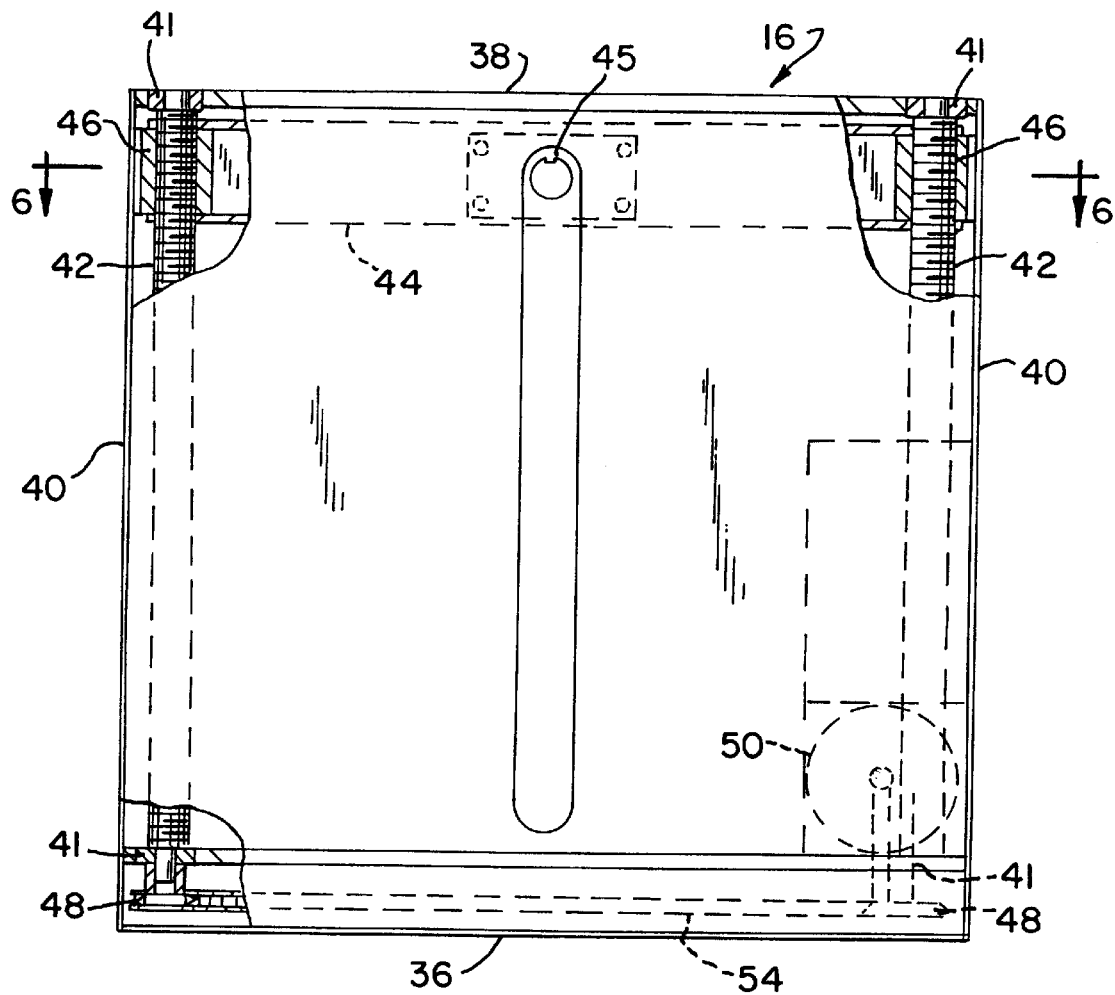
FIG. 5 is a side view of the container partly broken away to show the lift assembly.

The present invention relates to a load and go transporter 10, as shown in FIG. 1, for moving a storage container 12 such as a tool box or the like to and from locations at different height levels. The transporter 10 generally includes a support assembly 14, FIGS. 2 and 3, a cross tube 44, FIG. 4, for connecting the lift assembly 16, FIG. 5, to the support assembly 14 with a container 12 connected to the lift assembly 16. The support assembly 14 provides the means for moving the transporter 10 between storage and work positions. The lift assembly 16, as shown in FIG. 5, provides the means for raising and lowering the container 12 to positions at different elevations.

Figure 2:
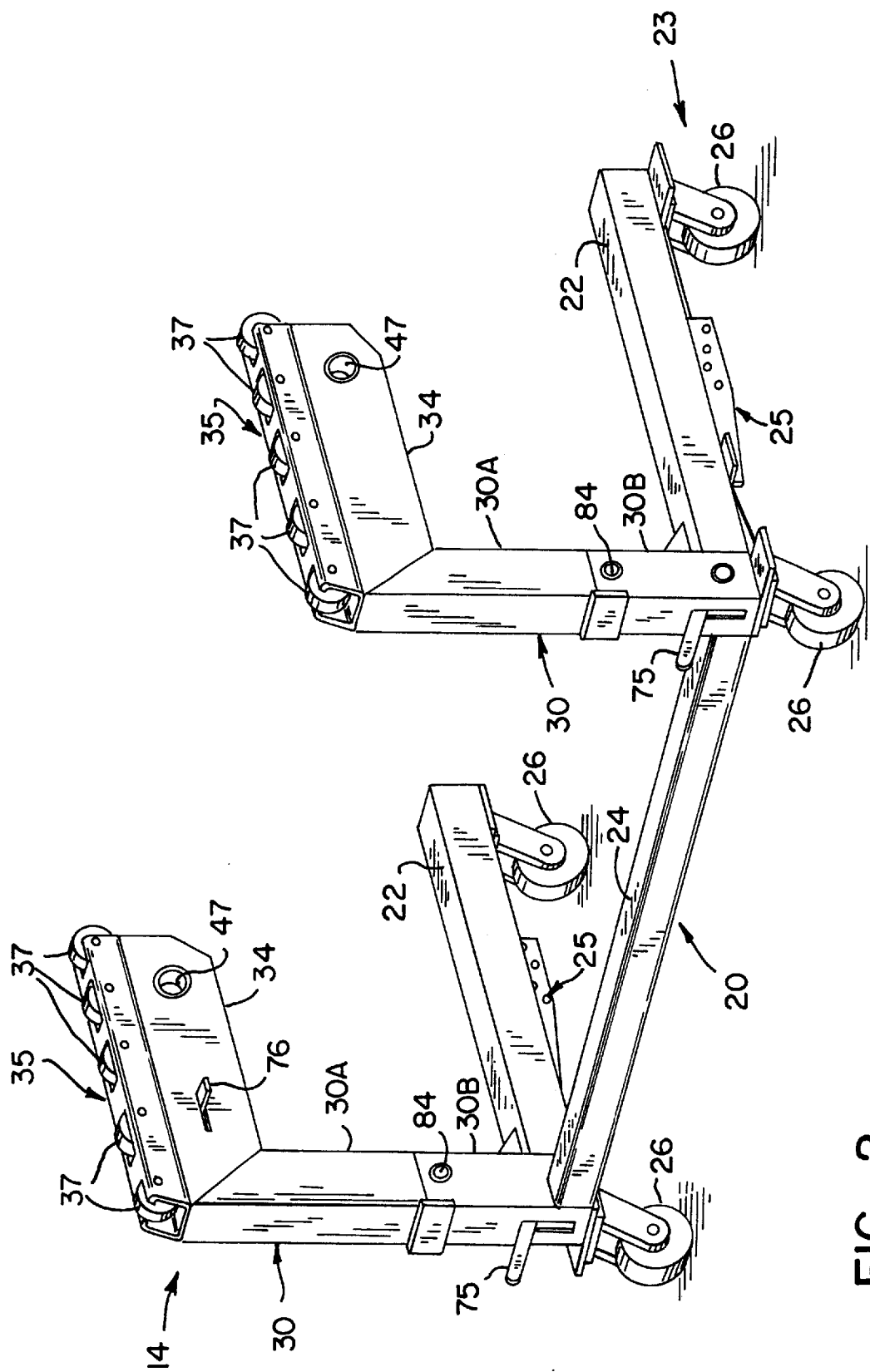
FIG. 2 is a perspective view of the support assembly.
Figure 3:
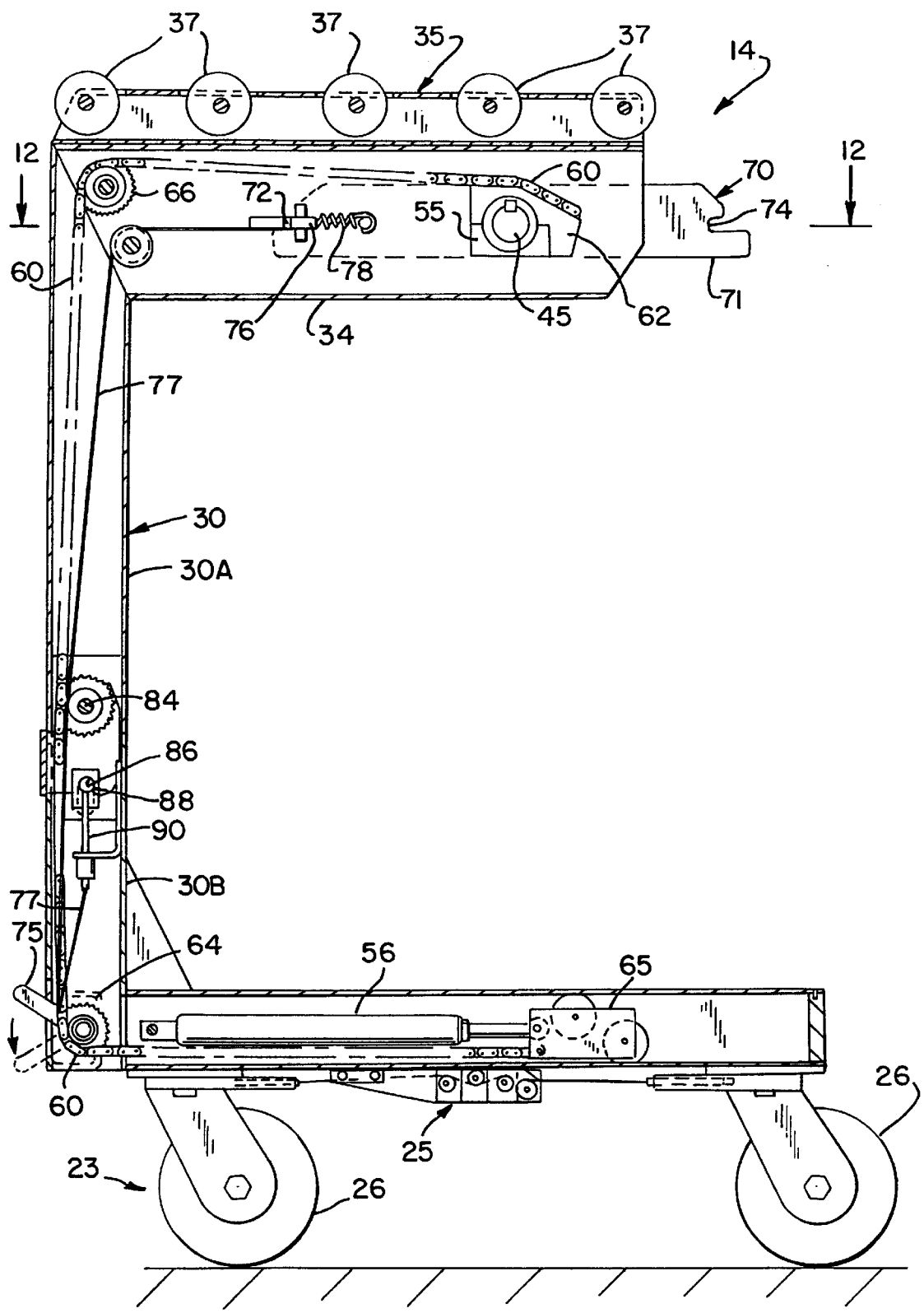
FIG. 3 is a side view of the support assembly partly broken away to show the counterbalance and lock mechanisms.
Figure 4:
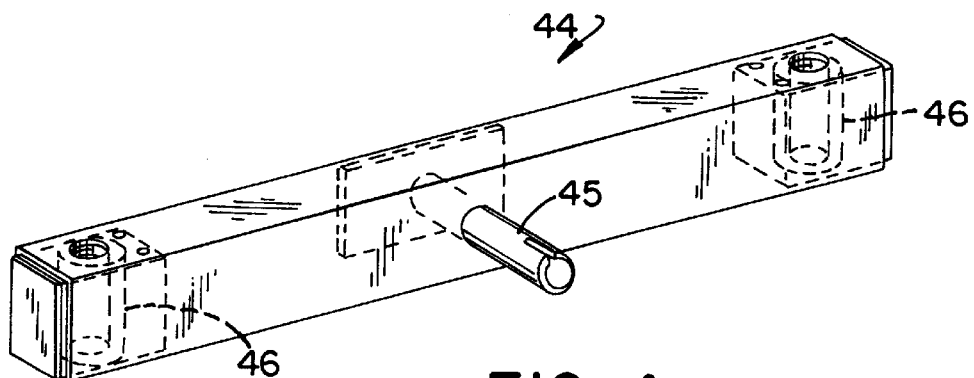
FIG. 4 is a perspective view of the lift bar.
Figure 6:
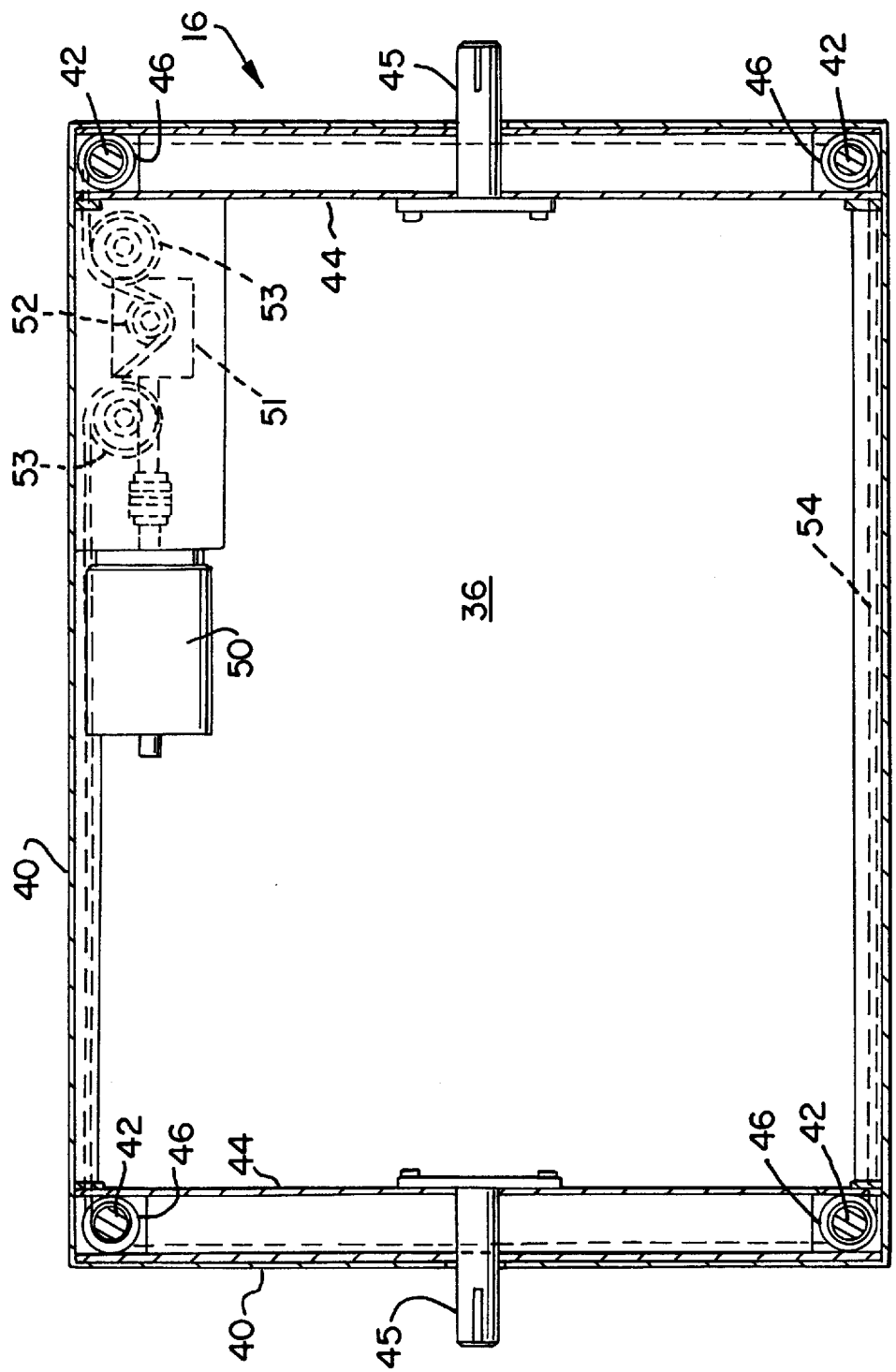
FIG. 6 is a top view of the container cut away to show the chain drive assembly for rotating the lead screws.
Figure 7:
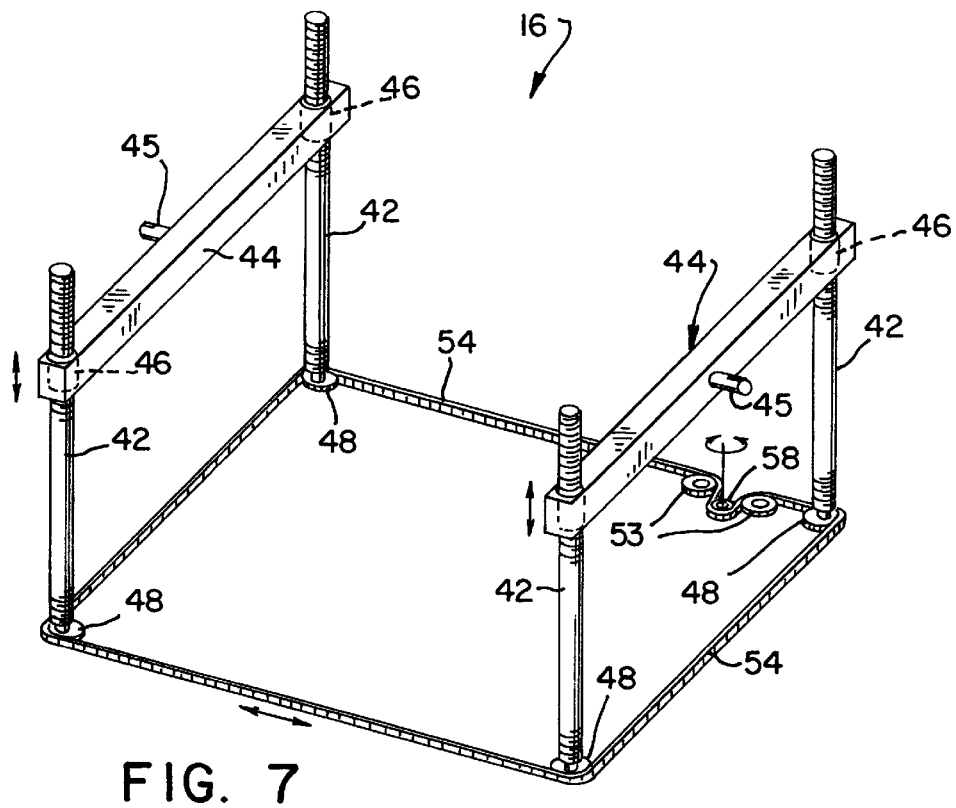
FIG. 7 is a perspective view of the cross bar with the lead screws shown threaded through the nuts in the cross bar.

The support assembly 14 as shown in FIGS. 2 and 3 generally includes a base frame 20 having a pair of legs 22 interconnected at one end by a cross member 24. A primary roller assembly 23 in the form of a set of swivel type wheel assemblies 26 are provided at the front and back of the legs 22. A foot actuated lock assembly 25 may be provided on the bottom of one or both of the legs 22 for locking the wheel assemblies 26 in a fixed position. A pair of vertical tube assemblies 30 are mounted on the back of each of the legs 22 to support a pair of horizontal brackets 34 mounted on the upper end of the tube assemblies 30 in a parallel relation to each other and to the legs 22. A secondary set of rollers 35 are mounted on the outside of each of the brackets 34 with the rollers 37 located above the brackets 34.

Figure 8:
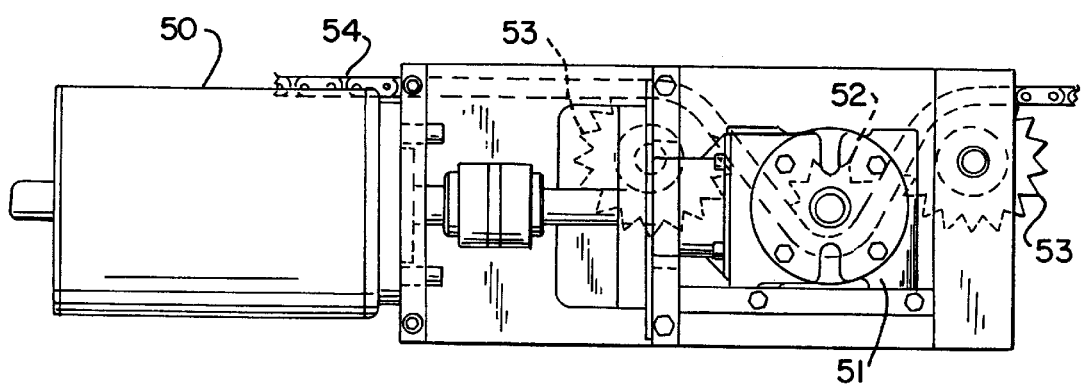
FIG. 8 is a top view of the powered chain drive mechanism.
Figure 9:
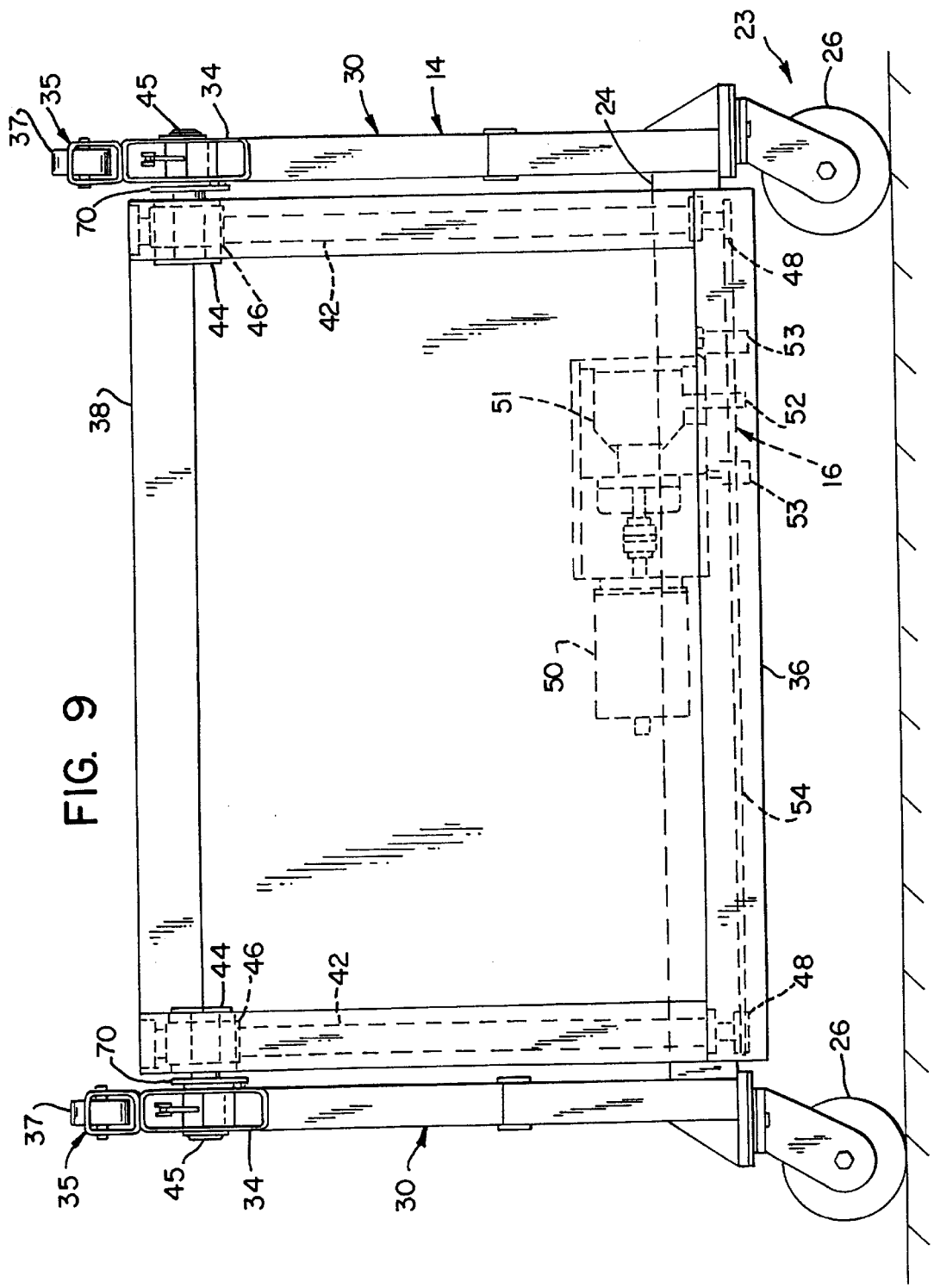
FIG. 9 is a view of the transporter with the lift assembly and a container shown in the transport position.

The lift assembly 16, as shown in FIGS. 5 through 9, includes a lower rectangular panel 36, and an upper rectangular panel 38 enclosed by wall panels 40. A vertical lead screw 42 is mounted in each of the corners of the panels 36 and 38. The lead screws 42 are supported therein by thrust and radial bearings 41 provided at each end of lead screws 42 in the panels 36 and 38. A cross tube 44 is mounted on the upper end of each pair of lead screws 42 with a nut 46 mounted on each lead screw 42 and captured in the ends of the cross tubes 44. A sprocket 48 is mounted on the bottom of each lead screw 42. An electric drive gear motor 50, FIG. 8, is connected to a drive sprocket 52 through a gear box 51 mounted on the lower panel 36. A hand crank may also be connected to the gear box 51 to actuate the lift assembly. A guide sprocket 53 is mounted on the panel 36 on each side of the sprocket 52 to align a roller chain 54 with the sprockets 48 on the bottom of the lead screws 42. On actuation of the motor 50 the lead screws 42 rotate with respect to the nut 46 raising the lift assembly 16 up or down with respect to the cross tubes 44. The cross tubes 44 are provided with pins 45 which pass through openings 47 in the mounting brackets 34 for supporting the cross tube 44 on the support assembly 14.

The mounting brackets 34 are provided with a lock lever assembly 70 for locking the support assembly 14 in the upright and in the upside down positions. In this regard the lock lever assembly 70 includes a pair of lock plates 71, each having a notch 72 and 74 in opposite ends of each of the plates 71. One plate 71 is mounted on the pin 45 on the outside of each of the cross tubes 44. A lock pin 76 is mounted on the bracket 34 in a position to engage one of the notches 72, 74. The lock pin 76 is biased by springs 78 into engagement with the notches 72 and 74. The lock pin 76 is withdrawn from the notches 72, 74 by means of a foot actuated pedal 75 which is connected to the lock pin 76 by a cable 77. The support assembly 14 can then pivot about the pivot pin 45 as described hereinafter.

Once the lift assembly 16 is positioned above the platform or deck 80 of the vehicle, the motor 50 is reversed to lower the container 12 onto the deck 80, the lift assembly 16 continues to run after the container is seated on the platform to raise the wheels 26 approximately 6 to 8 inches off the ground.

Figure 10:
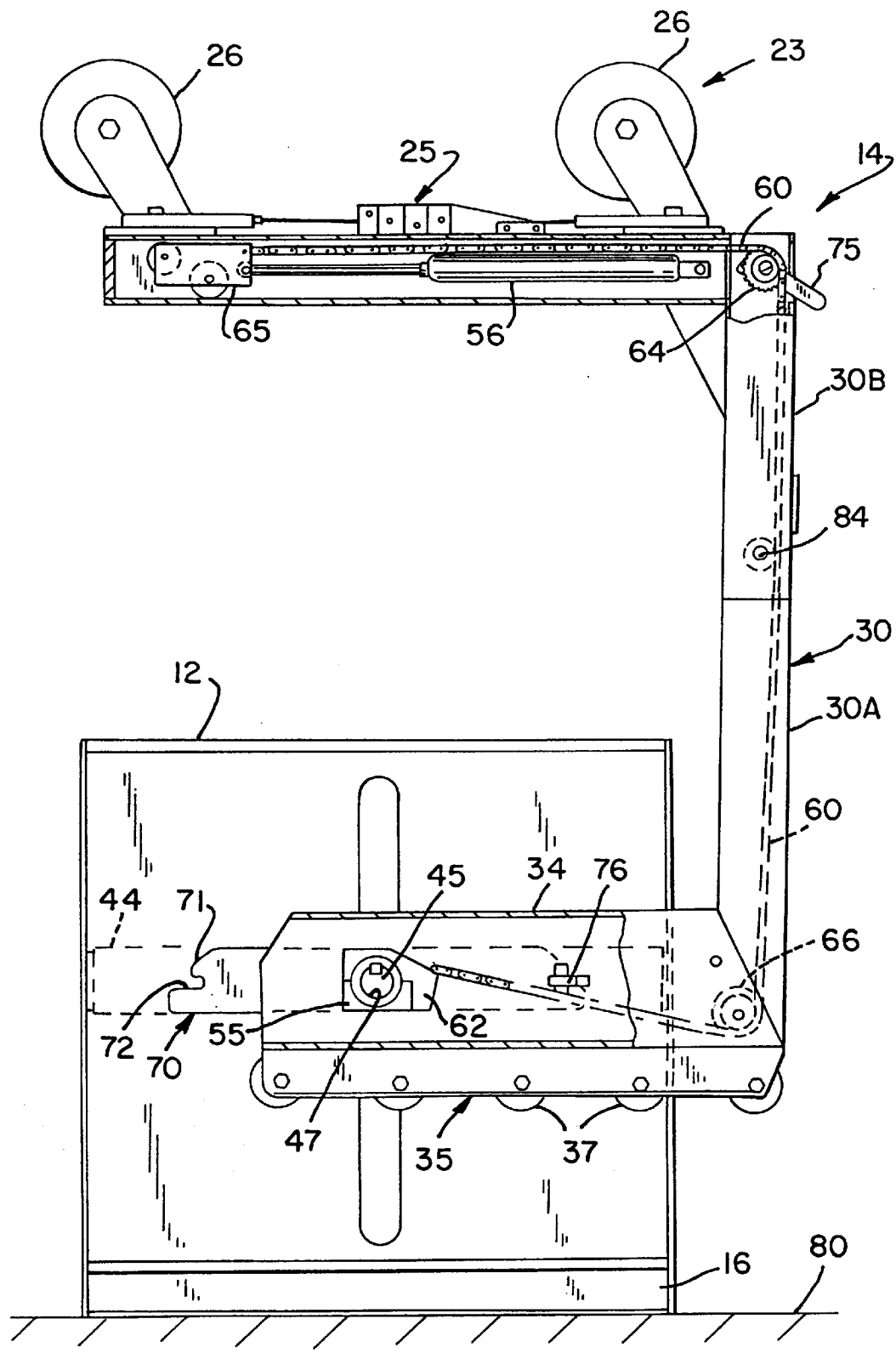
FIG. 10 is a side view of the support assembly pivoted to the inverted position with respect to the container.

The support assembly 14 is then manually pivoted about pins 45 to a storage position with respect to the lift assembly 16. The support assembly 14 is biased by a gas spring 56 to the storage position. In this regard, a plate 55 is keyed to each of the pins 45 provided on each of the cross tubes 44. A cable or chain 60 has one end connected to an arm 62 of the plate 55 and the other end connected to a trolley 65 at the end of the gas spring 56. The gas spring 56 is mounted in each of the lower legs 22 of the support assembly 14. The chain 60 is wrapped around sprockets 64 and 66 at each end of the tubular uprights 30 with the end of each chain 60 connected to the trolley 65 at the end of the gas spring 56. When the support assembly 14 is lifted up it will pivot around the pins 45. The chain 60 will pivot around the end of the arm 62 on the plate 55 as the support assembly pivots to the storage position as shown in FIGS. 10 and 11.

The legs will initially pivot approximately 30° to 45° by the counterbalance force of the gas spring 56. The operator adds additional lift to rotate the legs past the horizontal position. As the legs go over horizontal the lock pin 76 will move into the notch 74 in the plate 70 to lock the support assembly in the upside down position as shown in FIG. 10.

The support assembly 14 may be folded to a storage position as shown in FIG. 11 by pivoting the lower section about a pivot pin 84. In this regard, the uprights 30 are split into two sections 30A and 30B. A notch 86 is provided in the end of section 30B. A pin 88 mounted on the lower section 30A is biased by a spring 90 into engagement with the notch 86. The pin 88 is connected to the foot pedal 75 by a cable 79 and is released from the notch 86 at the same time that the foot pedal 75 is actuated to release the support assembly so that the support assembly can pivot to the storage position.

Once the support assembly 14 is locked in the upside down position, the lift mechanism is reversed so that the support assembly 14 moves downward. The secondary roller assembly 35 on the support assembly 14 will engage the deck and the container will then be lifted off of the deck so that it is supported by the secondary roller assembly 35. The secondary roller assembly 35 can then be used to move the transporter to the end of the platform.

Figure 13:
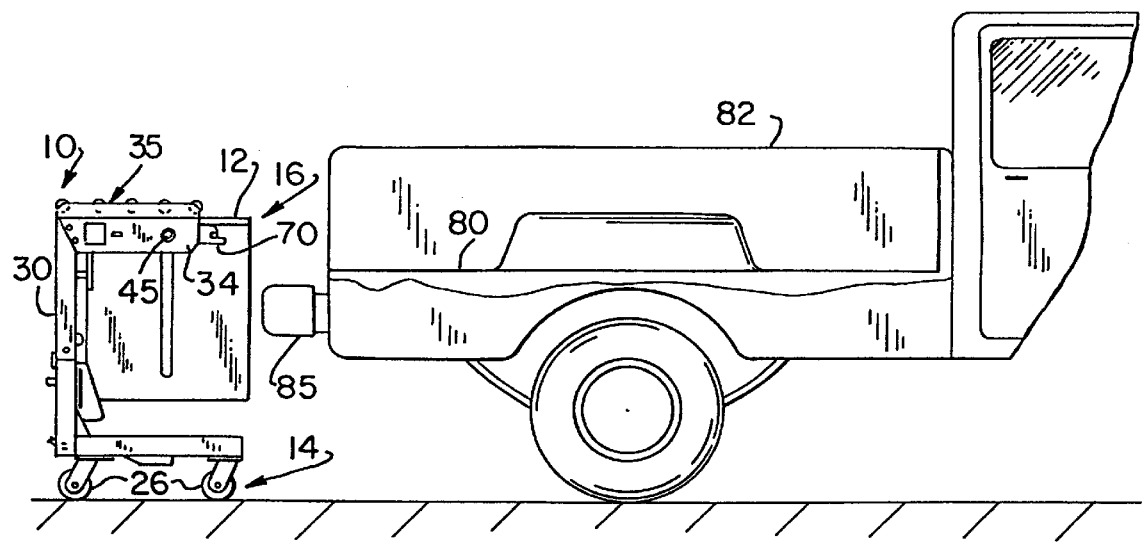
FIG. 13 is a side view of the transporter with the container shown in position to be loaded on the deck of a truck.
Figure 14:
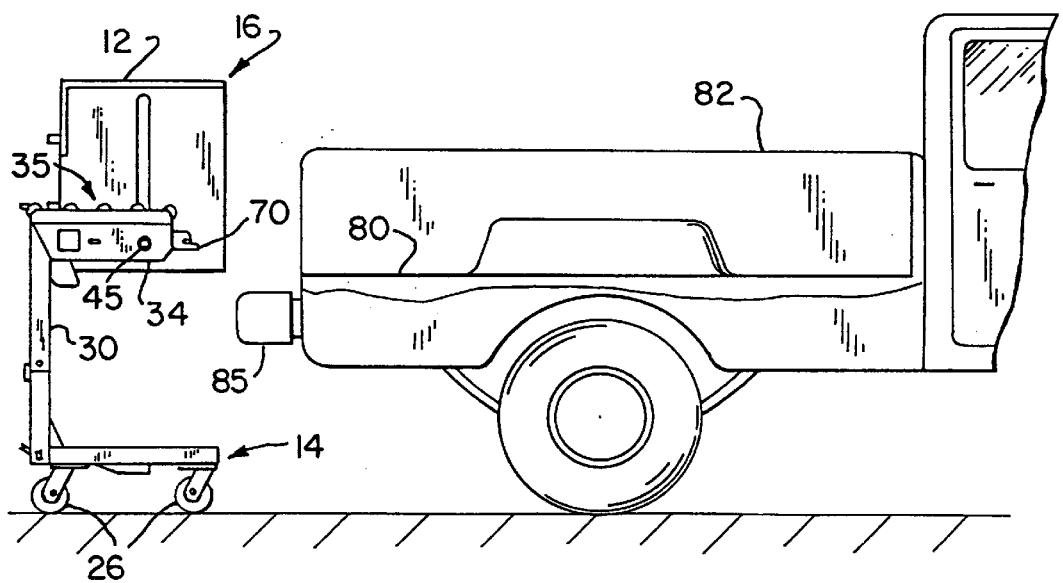
FIG. 14 is a view showing the container in the elevated position.
Figure 15:
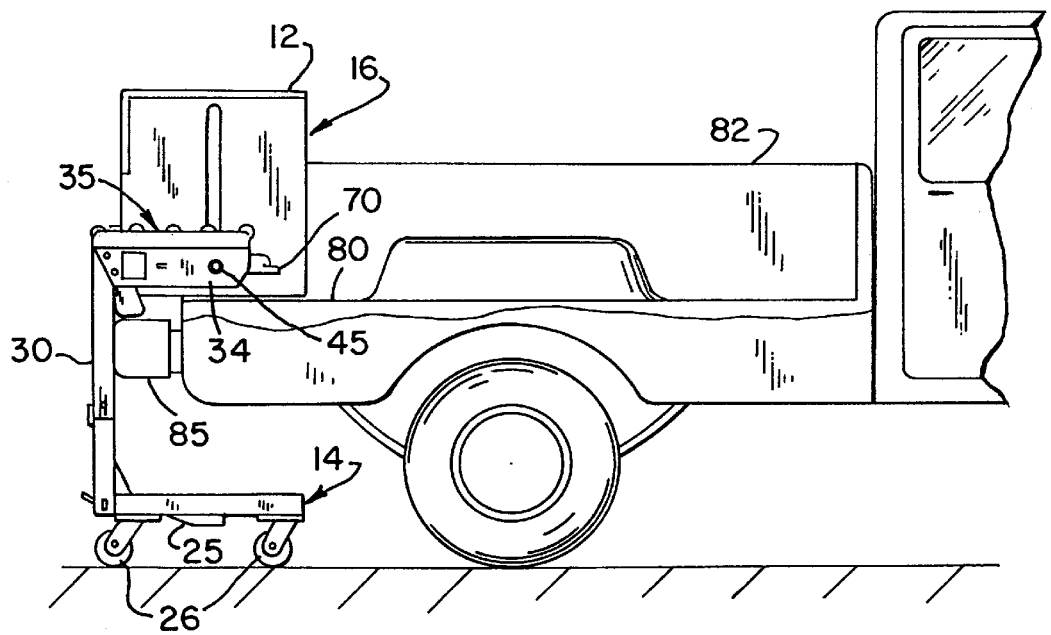
FIG. 15 is a view of the container supported above the deck of the truck.
Figure 16:
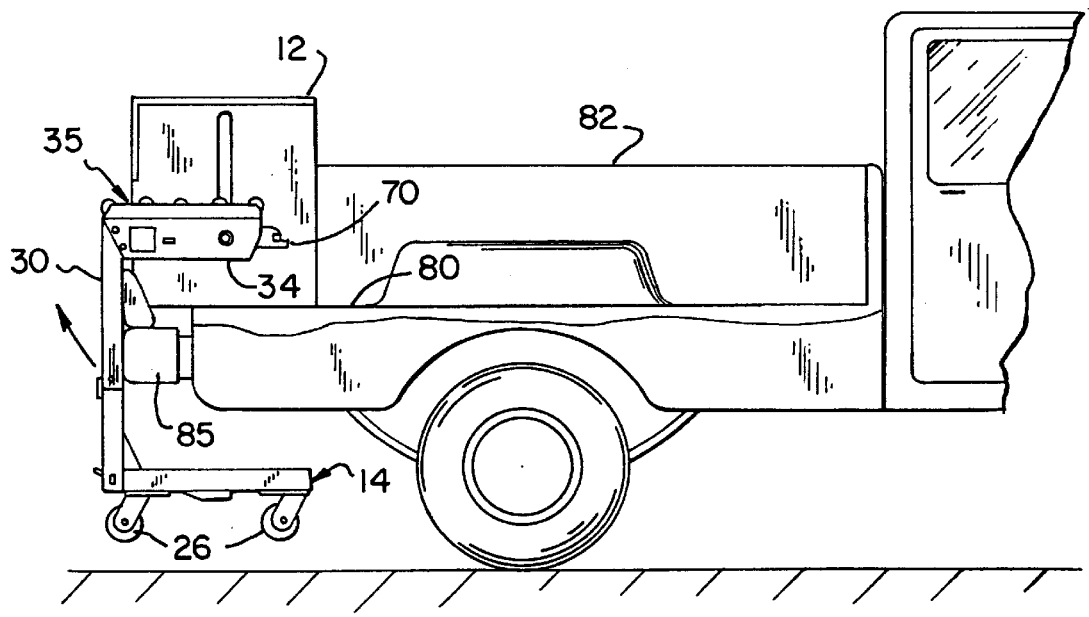
FIG. 16 is a view showing the container resting on the deck of the truck with the support assembly elevated.
Figure 17:
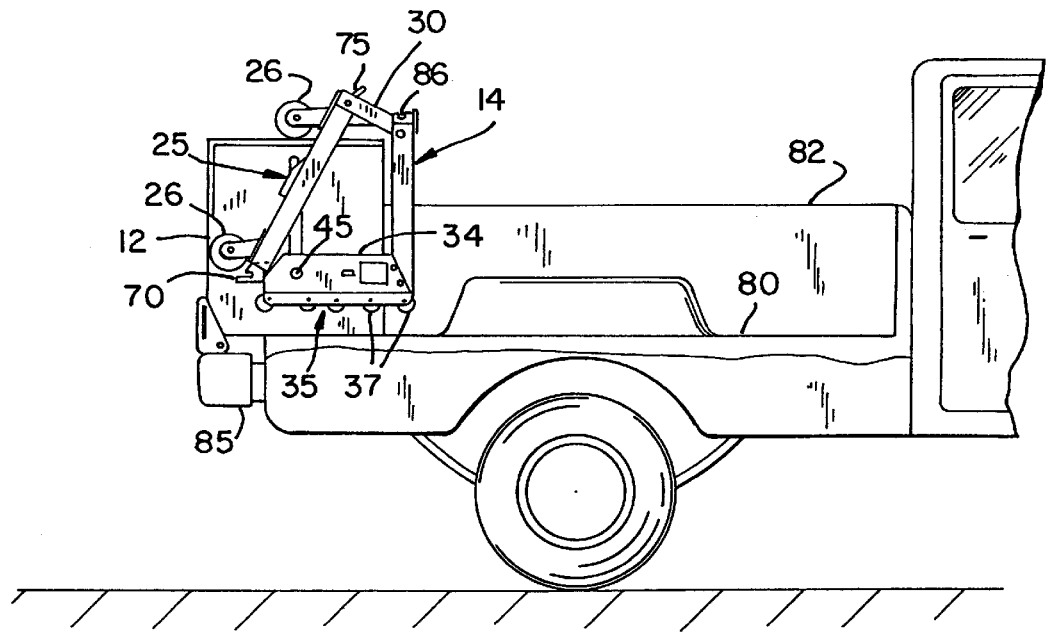
FIG. 17 is a side view of the transporter with the support assembly shown pivoted to the storage position.
Figure 18:
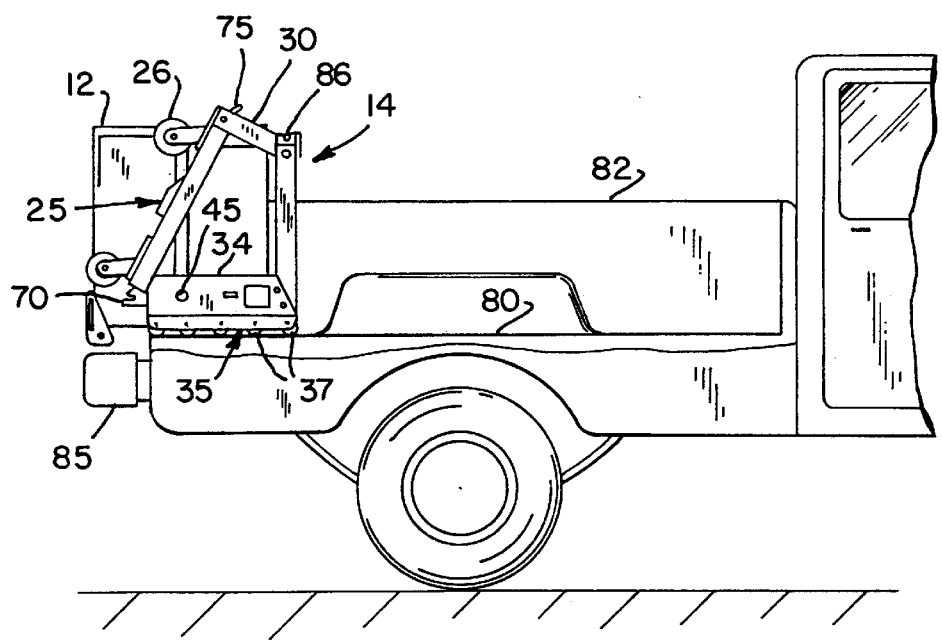
FIG. 18 shows the secondary set of rollers in contact with the deck of the truck.
Figure 19:
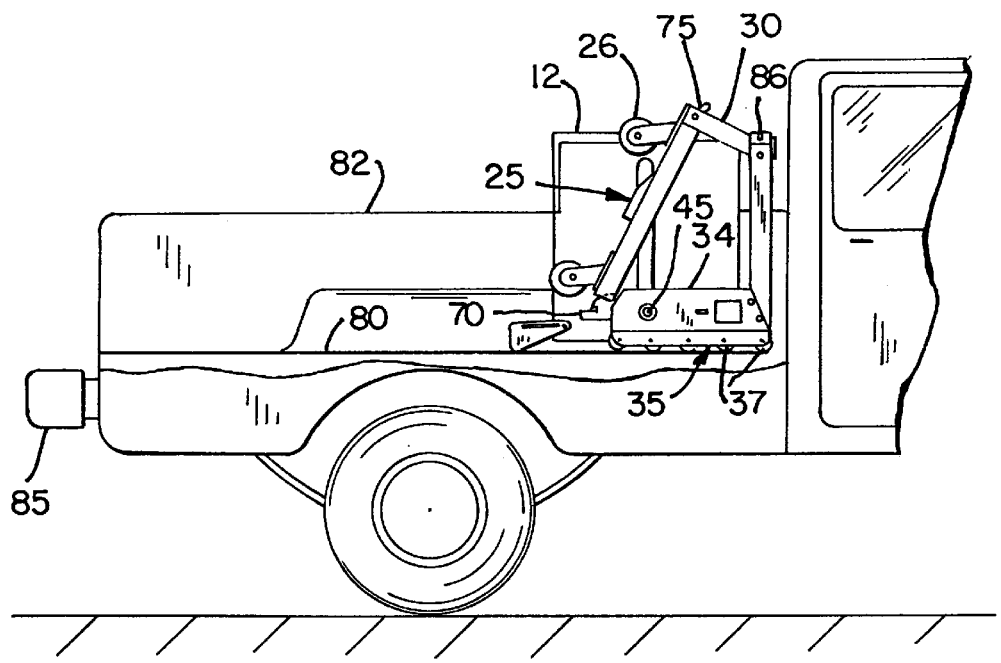
FIG. 19 is a view of the transporter moved to the front of the deck.
Figure 20:
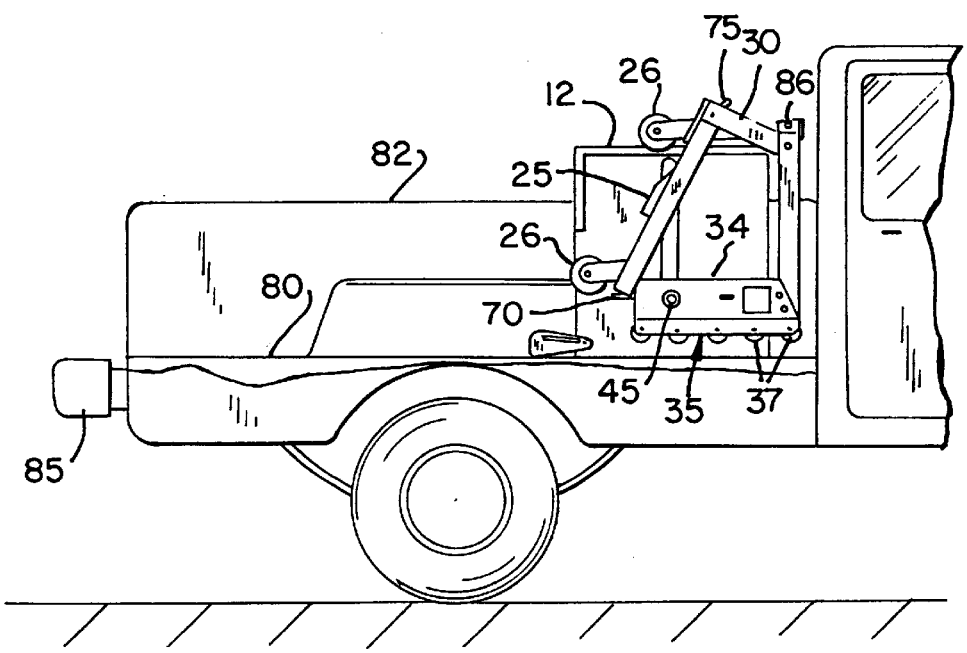
FIG. 20 is a view showing the container set on the deck and the secondary set of rollers raised above contact with the load deck and the support assembly collapsed.

Referring to FIGS. 13 through 20, the sequence in the operation of the transporter 10 is shown for loading a heavy duty unit into a pickup truck. The transporter as shown in FIG. 13 is initially rolled into alignment with the back of a truck 82 which is partially broken away to show the deck 80. The container 12 is supported by the lift assembly 16 which is shown supported on the brackets 34 of the support assembly 14. The lift assembly 16 is actuated to elevate the container 12 to a position above the deck 80 of the truck as shown in FIG. 14. The transporter 14 is then rolled into engagement with a bumper 85 with the lift frame 16 suspended above the deck 80 as shown in FIG. 15. The lift assembly 16 is lowered to set the container 12 on the deck 80 and a pair of attached loading legs 90 onto the bumper 85. The support assembly 14 is then elevated as shown in FIG. 16 sufficiently to clear the wheel assembly 26 from the ground. The support assembly 14 is then rotated to the storage position as shown in FIG. 17. As noted herein the support assembly 14 is biased by the gas spring 56 so that the operator can easily and quickly pivot the support assembly 14 to the storage position. The lift assembly 16 is then reversed to move the secondary roller assembly 35 into contact with the deck 82 as shown in FIG. 18. The transporter is pushed forward on the roller assembly 35 to the front of the deck as shown in FIG. 19. The lift assembly is then actuated to raise the support assembly off the deck 80 so that the container rests on the deck.

Figure 21:
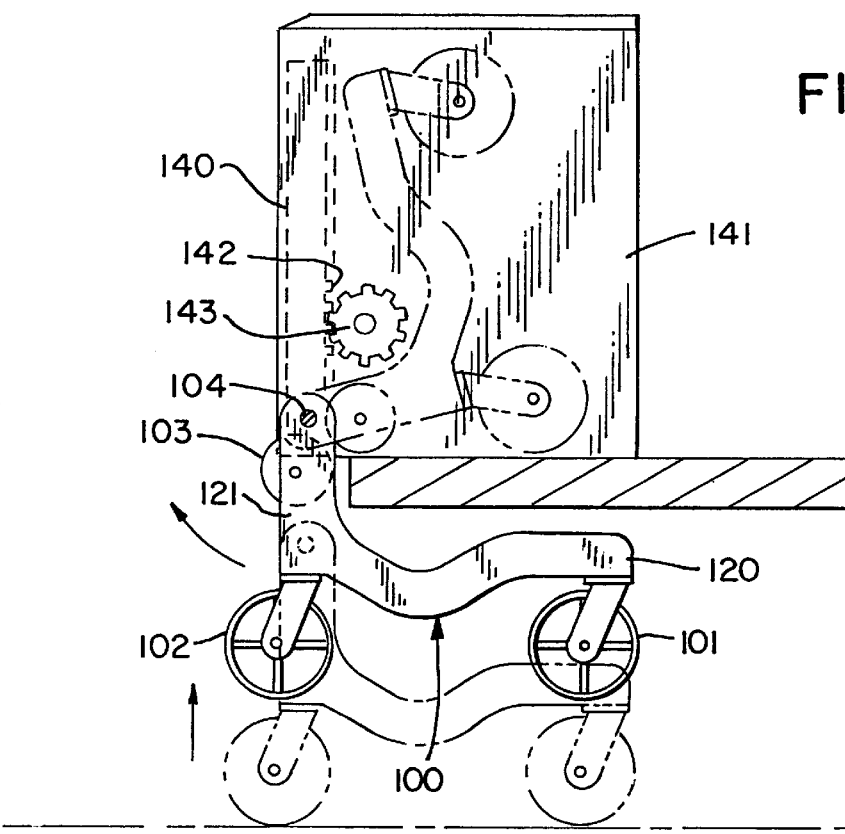
FIG. 21 is a schematic side view of a second embodiment of the transporter with its support assembly shown in its the transport position, in its intermediate raised position and in its inverted position.

Referring now to FIG. 21, there is schematically shown a second embodiment of the transporter of the present invention. In this embodiment, the support assembly includes a pair of generally L-shaped legs 100 (only one of which is shown) pivotally mounted on the lift assembly via pin 104.

Each leg 100 includes a primary roller assembly on its long section 120 for providing the means for moving the transporter and load at a lower level along the ground, and a secondary roller assembly on its short section 121 that provides a means for moving the transporter and load at a higher level on the truck deck. The primary roller assembly is in the form of a pair of spaced, swivel type wheel assemblies 101 and 102. Wheel assembly 101 is located at the forward or free end of leg section 120 while wheel assembly 102 is located at the rear end of leg section 120 at a position intermediate the ends of leg 100. The secondary roller assembly also comprises a pair of wheel assemblies which includes wheel assembly 102 and roller 103. Roller 103 is located closely adjacent to pivot pin 104 which pivotally mounts leg 100 to the lift assembly. Roller 103 is in the form of an idler roller rotatably mounted to leg 100.

The lift assembly includes a rack member 140 extending within container 141 having teeth 142 along one edge that mesh with a gear 143. Gear 143 may be driven by an electric motor (not shown) mounted within container 141 or by a hand crank (not shown) to raise and lower legs 100 and/or container 141 as previously described herein.

In operation, the transporter shown in FIG. 21 functions in an identical manner as previously described herein with respect to FIGS. 1–20 with the exception that wheels 101 and 102 function as the means for moving the transporter and load into the positions shown in FIGS. 13–15. After pivoting leg 100 to its inverted position, wheel assembly 102 and roller 103 function to provide the means for moving the transporter and load in accordance with FIGS. 17–20. Thus, in this embodiment, the support assembly is substantially simplified in structure.

Figure 22:
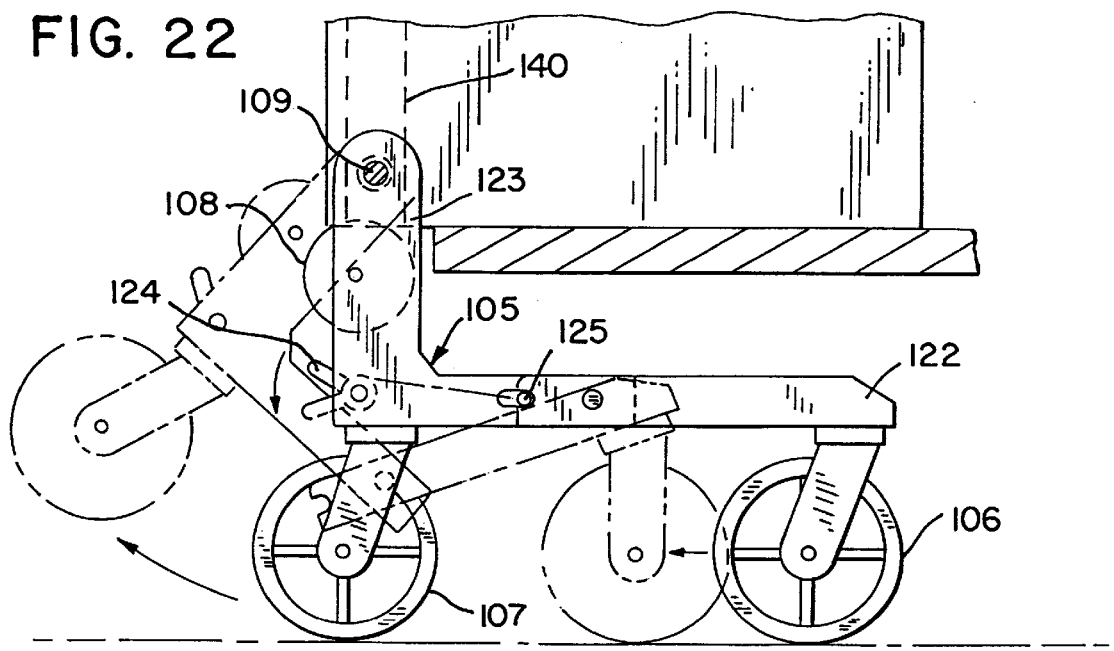
FIG. 22 is a schematic side view similar to FIG. 21 of a third embodiment of the transporter with its support assembly shown in its transport position and in its intermediate position.

Referring now to FIG. 22, there is shown a third embodiment of the transporter of the present invention. In this embodiment, the legs 105 of the support assembly are substantially L-shaped and include a primary roller assembly on its long section 122 in the form of a pair of swivel type wheel assemblies 106 and 107 together with a secondary roller assembly on its short section 123 in the form of swivel type wheel assembly 107 and roller 108. The operation and function of wheel assemblies 106 and 107 as well as roller 108 is identical to that described above with respect to FIG. 21. However, in this third embodiment, wheel assembly 106 may further be moved between an extended position shown in solid lines in FIG. 22 and a folded position shown in dotted lines in FIG. 23. This structure provides a more compact storage position and reduces the arc of leg 105 when pivoting on pin 109 between its initial lower position and its second, higher storage position (FIG. 23). The split section of leg 105 may be locked and released via lever 124 and a spring biased pin 125 in a manner similar to that described with respect to FIG. 11.

Referring now to FIGS. 24 and 25, there is illustrated a fourth embodiment of the transporter of the present invention. In this embodiment, the same wheel assemblies are employed for both moving the transporter and load along the ground as well as for moving the transporter and load on the truck deck. This embodiment thus eliminates the need for primary and secondary roller assemblies as described with respect to previous embodiments herein, and integrates their functions into a single roller assembly. More particularly, FIG. 24 illustrates a C-shaped leg 110 pivotably mounted via a pivot pin 111 on the lift assembly of the transporter. The lower portion of the support assembly includes a leg section 112 on which is mounted a pair of spaced, swivel type wheel assemblies 113 and 114. A vertical tube assembly 115 is mounted on the back of leg section 112 to support a horizontal bracket 116 mounted on the upper end of tube assembly 115 in a parallel relation to leg section 112. As previously noted herein, bracket 116 is pivotally mounted via pin 111 to the lift assembly of the transporter.

In operation, the embodiment shown in FIGS. 24 and 25 initially operates in a manner identical to that previously described with respect to FIGS. 13–16. However, upon pivoting leg 110 upwardly so that tube 115 is substantially horizontal (FIG. 24), leg section 112 and wheel assemblies 113 and 114 may be folded down by pivoting the leg section 112 about a pivot pin 117. In this regard, tube 115 may be split into two sections as shown best in FIG. 24, and is held between locked and unlocked positions by a lever and spring biased pin similar to that described with respect to FIG. 11. Thus, once folded, leg section 112 and wheel assemblies 113 and 114 may be pivoted downwardly and inwardly until leg section 112 is substantially parallel with tube 115 (FIG. 25) so that wheel assemblies 113 and 114 are directly over the truck deck 118. The wheel assemblies 113 and 114 may then be lowered to engage the truck deck 118. The transporter may now be operated substantially as previously described herein with respect to FIGS. 17–20 to move the load into the truck.

Figure 26:
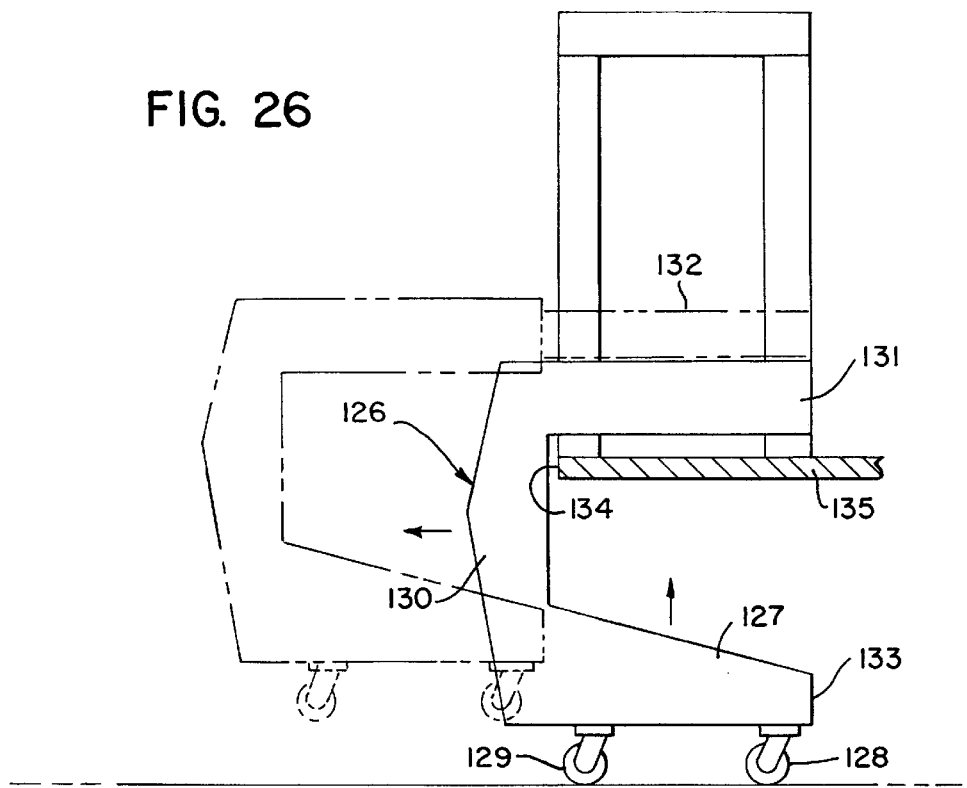
FIG. 26 is a schematic side view of a fifth embodiment of the transporter with its support assembly shown in its transport position and in its intermediate raised position.
Figure 27:
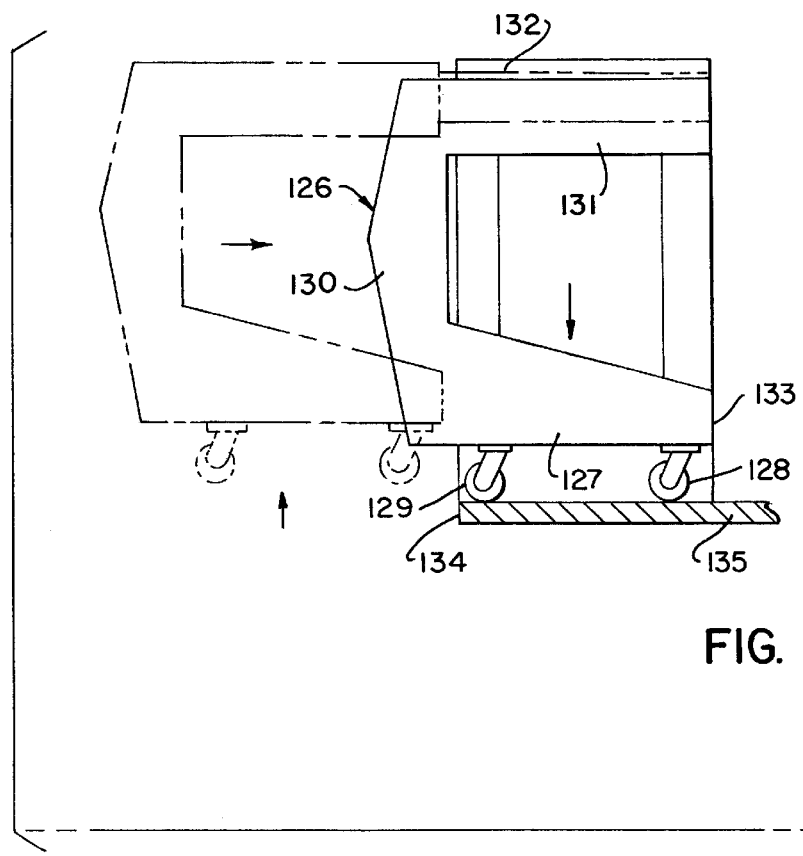
FIG. 27 is a schematic side view of the transporter of FIG. 26 with its support assembly shown in its elevated position and in its storage position.

Referring now to FIGS. 26 and 27, there is illustrated a fifth embodiment of the transporter of the present invention. In this embodiment, like the embodiment of FIGS. 24 and 25, the same wheel assemblies are employed for both moving the transporter and load along the ground as well as for moving the transporter and load on the truck deck. Thus, the embodiment once again eliminates the need for dual roller assemblies as described with respect to previous embodiments, and integrates their functions into a single roller assembly like the embodiment of FIGS. 24 and 25. More particularly, FIG. 26 illustrates a C-shaped leg 126 which includes a lower leg section 127 on which is mounted a pair of spaced, swivel-type wheel assemblies 128 and 129. A vertical section 130 is mounted on the back of leg section 127 to support a horizontal upper leg section 131 mounted on the upper end of section 130 in a parallel relation to leg section 127. Upper leg section 131 is in telescoping relation which a bracket 132 which in turn is affixed to the lift assembly. Thus, the C-shaped support leg 126 may be slid or shifted laterally, i.e. to the left in FIG. 26, so that the forward edge 133 of lower leg section 127 is spaced rearwardly of the edge 134 of deck 135, as will hereinafter be described.

In operation, the embodiment shown in FIGS. 26 and 27 initially operates in the manner identical to that previously described with respect to FIGS. 13–16. However, upon lifting leg 126 so that wheel assemblies 128 and 129 are off the ground, the entire leg 126 may be slid rearwardly on bracket 132 so that, as shown best in FIG. 26, leg 126 hangs in a cantilevered manner from bracket 132. In this position, edge 133 is rearwardly spaced from edge 134 so that, as shown best in FIG. 27, leg 126 may be raised by the lift assembly to an elevated position such that wheel assemblies 128 and 129 are spaced slightly above the upper surface of deck 135. Thereafter, leg 126 is slid or shifted forwardly on bracket 132 until wheel assemblies 128 and 129 are directly over deck 135. Once in this position, leg 126 and wheel assemblies 128 and 129 may then be lowered by the lift assembly to engage truck deck 135. The transporter may then be operated substantially as previously described herein with respect to FIGS. 17–20 to move the load into the truck.

Thus, it should be apparent that there has been provided in accordance with the present invention a self-loading material or equipment transporter that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A transporter for moving itself and a load between a first surface disposed at a lower level and a second surface disposed at a higher level, the transporter comprising:

a load-holding member having a bottom wall;

a lift assembly connected to said load-holding member and operable to raise and lower said load-holding member;

a support assembly for supporting said load-holding member, said support assembly including a leg member rotatably mounted on said lift assembly for movement between a lower transport position and an upper stored position when said bottom wall is in contact with the second surface to support said load-holding member on the second surface; and wheel means on said leg member for providing movement for said support assembly, lift assembly and load-holding member, such that when said leg member is in either said lower transport position or said upper stored position only said wheel means on said leg member contact the first or second surface.

2. The transporter according to claim 1 wherein said wheel means includes a first set of rollers for providing movement in said lower transport position and a second set of rollers for providing movement in said upper stored position.

3. The transporter according to claim 1 wherein said leg member includes a split section, and lock means for releasably locking said split section between a rigid position and a folded position.

4. A transporter for moving itself and a load between a first surface disposed at a lower level and a second surface disposed at a higher level, the transporter comprising:

a load-holding member;

a lift assembly connected to said load-holding member and operable to raise and lower said load-holding member;

a support assembly for supporting said load-holding member, said support assembly including at least one generally L-shaped leg member having a long section and a short section, said short section being pivotally mounted on said lift assembly for movement of said leg member between a lower transport position and an upper stored position;

a primary roller assembly on said long section of said leg member for providing movement for said support assembly, lift assembly and load-holding member when said leg member is in said lower transport position; and a secondary roller assembly on said short section of said leg member for providing movement for said support assembly, lift assembly and load-holding member when said leg member is in said upper stored position.

5. The transporter of claim 4 wherein said long section of said leg member includes a split section, and lock means for releasably locking said split section between a rigid position and a folded position.

6. The transporter of claim 4 wherein said lift assembly includes a rack member and said support assembly includes a corresponding gear for operatively engaging said rack member, wherein said lift assembly moves upwardly or downwardly with respect to said support assembly in response to the direction of rotation of said gear.

7. The transporter of claim 6 wherein said lift assembly is powered by an electric motor.

8. The transporter of claim 6 wherein said lift assembly is powered by a hand crank.

9. A transporter for moving itself and a container between a first surface disposed at a lower level and a second surface disposed at a higher level, the transporter comprising:

a lift assembly connected to the container and operable to raise and lower the container;

a pair of leg members mounted to the lift assembly for providing support for the container and the lift assembly, each leg member being rotatable between a lower transport position and an upper stored position when the container is in contact with and supported by either the first or second surface; and wheel means on each of the leg members for providing movement of the container, the lift assembly, and the leg members when the leg members are in either the lower transport position or the upper stored position.

10. The transporter of claim 9 wherein each of the leg members is generally L-shaped having a long section and a short section, the short section being pivotally mounted on the lift assembly.

11. The transporter of claim 10 wherein the wheel means includes a primary roller assembly on the long section of each leg member for providing movement when the leg members are in the lower transport position, and a secondary roller assembly on the short section of each leg member for providing movement when the leg members are in the upper stored position.

* * * * *